United States Patent [19]
Von Kohorn

[11] Patent Number: 4,745,468
[45] Date of Patent: May 17, 1988

[54] SYSTEM FOR EVALUATION AND RECORDING OF RESPONSES TO BROADCAST TRANSMISSIONS

[76] Inventor: Henry Von Kohorn, 215 Rocky Rapids Rd., Stamford, Conn. 06903

[21] Appl. No.: 837,827

[22] Filed: Mar. 10, 1986

[51] Int. Cl.$^4$ .............................................. H04H 9/00
[52] U.S. Cl. ........................................ 358/84; 455/2; 434/323
[58] Field of Search ....................... 179/2 AS; 358/84; 434/316, 323, 350, 351, 362; 455/2, 5

[56] References Cited

U.S. PATENT DOCUMENTS

| | | | |
|---|---|---|---|
| 3,606,688 | 9/1971 | Zawels et al. | 434/323 |
| 4,044,380 | 8/1977 | Justice et al. | |
| 4,264,924 | 4/1981 | Freeman | |
| 4,268,744 | 5/1981 | McGeary | |
| 4,271,351 | 6/1981 | Bloodworth | |
| 4,573,072 | 2/1986 | Freeman | 358/84 X |
| 4,630,108 | 12/1986 | Gomersall | 358/84 |

FOREIGN PATENT DOCUMENTS 1287304 8/1972 United Kingdom ................ 434/323

*Primary Examiner*—Keith E. George
*Attorney, Agent, or Firm*—Perman & Green

[57] ABSTRACT

A system for evaluating responses to broadcast programs, such as television programs, includes an instructional signal modulated onto an audio signal transmitted concurrently with the television program. At each of a plurality of remote receiving stations, one or more members of a remote audience has the opportunity to respond to a situation presented in the television program by entering a response on a keyboard. The system includes, at each remote receiving station, a memory responsive to the instructional signal for storing desired responses or response criteria, and a comparison circuit for comparing responses entered at the keyboard with the response criteria stored in the memory. Also provided is electronic circuitry for scoring the responses in accordance with commands from the instructional signal, and a recording device for providing a permanent record of the audience score at each of the remote receiving stations.

20 Claims, 3 Drawing Sheets

SYSTEM FOR EVALUATION AND RECORDING OF RESPONSES TO BROADCAST TRANSMISSIONS

BACKGROUND OF THE INVENTION

This invention relates to transmission by broadcast media including radio and television broadcasting programs to listeners and viewers of the programs and, more particularly, to the transmission of signals designating questions or tasks and response criteria for evaluating responses of the listeners and viewers to the broadcast programs.

A common form of program transmitted by the broadcast media is the quiz program. Typically, in such a program, a panel of people provide answers to questions arising from the subject matter of the quiz. Often, the answers are indicated by use of a keyboard with electronic circuitry. The answers may be provided in response to questions which are asked directly, or in response to a situation or task presented by the program such as in the solving of a puzzle.

A characteristic of such quiz programs is the fact that the responses to the questions are limited to participants in the studio audience. The much larger external audience, namely the listeners of radio and viewers of television, are generally excluded from participation except for those few people who, on occasion, may have the opportunity to call in a response via telephone to a situation arising in the program. Letter writing has also been employed as a means for response to questions and other matters raised by the program.

Thus, it is apparent that a problem exists in that the larger external audience is essentially excluded from active participation in the broadcast programs. In view of the fact that the studio audiences can provide their responses electronically, it is clear that personal involvement, such as conversation among participants, is not necessarily required. It is, therefore, apparent that such programs should be open to participation to the larger external audience in addition to the studio audience; yet, no system providing for such participation has been available.

It is noted that this problem is not limited to quiz programs only, but that other forms of programs including educational and sports programs might also be conducted in a fashion allowing active public participation if a suitable system were available to make such public participation possible. A desirable feature of such a system would be the capability for evaluating and recording the responses, a feature that would be most useful in the case of educational programs because such a feature would permit a teacher to grade examinations dispensed to students by the broadcast media. Such a system would be useful in commercial ventures wherein a prize is to be given to a participant providing a correct answer. In such a case, the participant would bring the recorded answer, which might be in the form of a coded credit card, to a store or other establishment for receipt of the prize. This would be a great convenience in the implementation of a sales and advertising program. However, in spite of the advantages which would be provided by such a system, for including the listening and viewing audience, no such system has yet been available.

SUMMARY OF THE INVENTION

The foregoing problem is overcome and other advantages are provided by a system for the evaluation of response to broadcast programs which, in accordance with the invention, provides for the transmission of signals designating questions and response criteria along with the broadcast program transmission.

In accordance with the theory of the invention, two signals are broadcast. The first of the two signals is the program signal itself which may be broadcast from a radio station or television station to the listening or viewing audience. For simplicity in describing the invention, an audience viewing a televised program is presumed, it being understood that the description of the invention in terms of the viewing audience applies also to the listening audience of a radio broadcast. The second of the two signals is in the nature of an instructional signal providing the questions to be answered, the amount of time available for an answer, and the proper content and form of the answer. Included at the site of each viewer in the external audience is electronic response equipment having circuitry for reception of the instructional signal, the response equipment also including a display for presentation of questions, a keyboard for designating answers to the questions, timing circuitry, and a recording device for recording answers to the question. The recording device includes preferably a dispenser for dispensing a record such as a magnetizable card containing a person's responses to the questions and/or a person's score in answering the questions.

A particular advantage of the invention is that it permits interaction between a person conducting a broadcast program and the external audience. This may be illustrated by way of example wherein a sportscaster is describing a sporting event such as a football game. The questions asked by the sportscaster may depend on which team is winning, on what plays have been accomplished, as well as on questions which may be called in by telephone from the listening/viewing audience.

In the practice of the invention, it is noted that the instructional signals may be transmitted before, concurrently, or subsequent to the transmission of the program signals in accordance with the nature of the questions and responses required. For example, in the event that the program situation deals with a college professor giving an examination, the correct answers to the various questions and the procedure for scoring answers to individual ones of the questions can be transmitted before the lecture in which the professor asks the questions. In the event that a limited period of time is available for response to each of the questions, then, at least a portion of the instructional signals must be sent concurrently with the program data, this portion being a timing signal which the professor would initiate when he asks the question. The timing signal would initiate operation of a timer in the electronic equipment at each of the receiving stations which are tuned to the broadcast program, the timer then clocking a requisite amount of time in accordance with an instructional signal which has been previously transmitted or is concurrently transmitted with the program data. In yet a further example, in the case of an interactive situation wherein the professor is responding to a comment made by a student in the classroom or, possibly in response to a telephoned inquiry, the professor may then ask a question for which the instructional signal designating the nature of the response would be transmitted after the question has been asked.

At a receiving station the electronic equipment includes a keyboard by which a viewer of the broadcast program enters a response. The response is stored in a buffer store for comparison with a correct response which is stored in a data memory. The correct response is provided as a data input to the data memory by the instructional signal. The comparison is provided by comparison circuitry which outputs a signal via timing circuitry to a score counter to provide a test score at the conclusion of response to a set of questions. The timing circuit, under control of a program memory, is activated upon request from the host of the transmitted program. Instructional signals transmitted by the host are modulated onto the audio portion of the transmitted signals and, subsequently at a receiving station, are demodulated and decoded to provide the data signals for the data memory, synchronization signals for operation of the timing circuitry, and instructional signals for operation of the program memory. The resulting score from the score counter is recorded in a readout device which, in a preferred embodiment of the invention, provides a card with an encrypted value of the score in a magnetic strip that is readily read by automatic card readers. According to one embodiment, a register may be included for the storage of responses which are printed or typed out in the form of a message, the message being passed on to the readout device under instruction of the program memory.

BRIEF DESCRIPTION OF THE DRAWING

The aforementioned aspects and other features of the invention are described in the following description, taken in connection with the accompanying drawing wherein.

DETAILED DESCRIPTION

Figure 1:
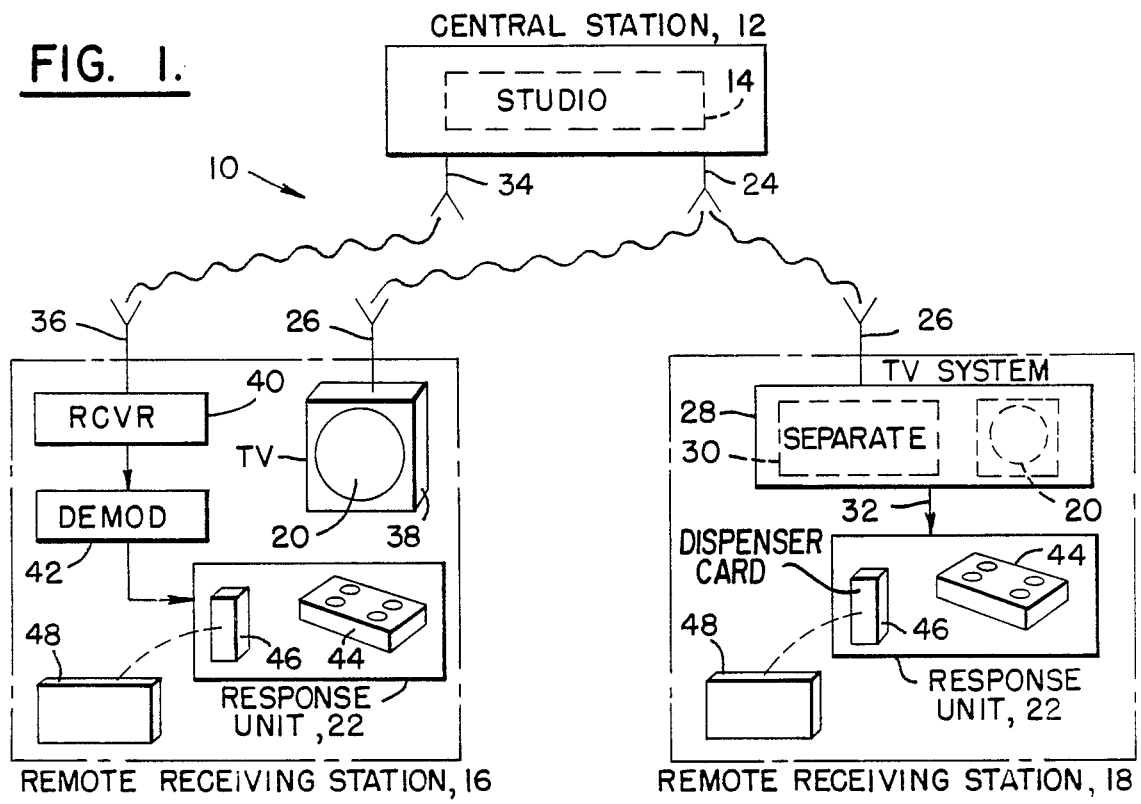
FIG. 1 is a simplified diagrammatic view of a system incorporating the invention and configured to show two embodiments of receiving stations, one receiving station employing simulcast radio and television signals of a program produced in a studio, and the second receiving station employing a television receiver system modified to receive an instructional signal from the studio.

FIG. 1 presents a simplified description of a system 10 wherein a central station 12 includes a studio 14, such as a television studio, and broadcasts programs to many remote receiving stations, two such receiving stations 16 and 18 being shown by way of example. In accordance with the invention, each of the receiving stations 16 and 18 includes means for observing the broadcast program, such as television screen 20, and means by which persons in the external viewing audience can respond to situations presented in the studio, the response means being a response unit 22 which evaluates and records responses entered by persons in the viewing audience.

Two signals are broadcast by the central station 12 to each of the receiving stations 16 and 18. One of these two signals is a program signal for presenting on the television screen 20 a program generated in the studio 14. The second of the two signals is an instructional or command signal for operation of the response unit 22, the instructional signal providing appropriate commands to the response unit 22 for rejecting or accepting, evaluating and scoring audience responses to questions raised or tasks presented in the televised program.

Two modes of transmission are provided for the two signals. In the case of the receiving station 18, both of the signals are carried by a single television channel carrier radiated from an antenna 24 of the central station 22, and received by an antenna 26 at the receiving station 18. The antenna 26 connects with a television system 28 which includes the foregoing television screen 20 and, furthermore, includes circuitry 30 for the separation of the instructional signal from the program signal. The instructional signal is then applied via line 32 to the response unit 22. In the case of the receiving station 16, the two signals are processed separately. The instructional signal is broadcast by a radio channel employing a radio antenna 34 at the central station 12, and received by an antenna 36 at the receiving station 16. Thus, at the receiving station 16, a standard television set 38 including the screen 20 receives the televised program via antenna 26 and presents the program on the screen 20. A separate radio receiver 40 and demodulator 42 are employed for receiving the instructional signal and for applying the instructional signal to the response unit 22.

In the practicing of the invention, the instructional signal may be transmitted to a remote receiving station in any convenient manner such as via a cable transmission or by a specially broadcast transmission (not shown) or by combining the instructional signal with the audio signal in a radio broadcast or television broadcast. The combination of the instructional signal with the audio spectrum is demonstrated in the graph of FIG. 2 which shows a typical relationship of amplitude versus frequency in a transmitted audio spectrum. In that spectrum, a relatively narrow frequency band is set aside for transmission of the instructional signal, the narrow frequency band being at the upper frequency edge of the audio spectrum.

For example, the bandwidth of the instructional signal may be approximately 1% of the audio bandwidth, this being sufficient to enable a relatively slow transmission of instructional data to the response units 22 in the respective receiving stations. By maintaining the amplitude of the instructional signal well below that of the audio signal, the instructional signal does not introduce any more than a negligible amount of interference with the audio signal. Also, it is noted that the instructional signal is not continuously present but, rather, appears only for a momentary burst of time less than, typically, a few seconds duration when necessary to instruct each response unit 22. In the case of the receiving station 16, a simulcast of radio and television is employed while, in the case of the receiving station 18, only the television program is broadcast, as has been described above. However, in both cases, the audio spectrum is the same, and the mode of combining the instructional signal with the audio transmission is the same. Typically, the system 10 would be implemented with only one of the transmissions, either the television transmission with the instructional signal combined therewith, as demonstrated by the receiving station 18, or by the simulcast of both the television and the radio transmissions as demonstrated by the receiving station 16. In the case of the simulcast, the instructional signal need not be combined with the television signal, the instructional signal appearing only in the radio broadcast from the antenna 34 as described above.

The receiver 40 and the demodulator 42 operate in a manner similar to that of the separation circuitry 30, and will be described in detail, hereinafter with reference to FIG. 3.

In both of the receiving stations 16 and 18, the response unit 22 includes a keyboard 44 whereby a person in the remote viewing audience enters a response. The response unit 22 includes a dispenser 46 which generates and dispenses a record of the score and/or responses in a permanent recording medium such as a card 48 of plastic, or similar material, and including a well-known strip of magnetizable material (no shown) upon which the score and/or responses have been recorded. Alternatively, by way of example, the dispenser 46 may be constructed in a form (not shown) for outputting a tape which has been imprinted or punched with the desired information. Easily recognizable indicia may also be imprinted on the tape or card.

The system described lends itself well to multi-part questions and/or to multiple choice answers, for any of which special forms can be provided, to be filled in or otherwise marked. The response recording and/or data entering means can have provisions for the insertion of special forms or blanks, which can be made available or mailed to participants. For example, a school may mail students forms specially prepared for a particular examination or assignment The response unit 22 may therefore be configured to hold a recording medium such as a paper blank to which markings are applied. Alternatively, the medium, such as a paper tape or continuous forms, may be inserted by the respondents.

Examination papers, whether taking the shape of filled-in forms, or whether comprising a free hand composition or narrative, may also be graded by the comparator means, which is capable of identifying key phrases and words that are expected to appear on the completed examination paper. In similar fashion, comparator means to be described hereinafter is designed so as to be able to recognize and accept any one or more of a plurality of predetermined key words or phrases.

Dispenser 46 can be adapted to award children who have provided answers meeting the predetermined response criteria by dispensing gold stars or other tokens. In another embodiment, the dispenser combines the coupons issued to winners with advertising material or shopping hints.

The records created pursuant to the present invention may be used as tokens, coupons, certificates and general proof of participation in the broadcast transmission program. Coupons may be redeemed by mail or in detail establishments for cash, prizes or discounts.

The following terms are useful in describing the system of the invention.

The term "task-setting" is intended to include the meaning of interrogative, opinion-eliciting and statement-eliciting.

The terms "evaluating" and "scoring" are intended to refer to and include the meanings of sorting, screening, analyzing and processing information, data and responses in accordance with predetermined criteria, ranging from simple comparing tasks to computerized processing and analyses.

The term "response" is intended to include answers, elicited opinions and statements, text and narrative provided by contestants, respondents, students and other participants in broadcasts calling for interaction, reaction and responses. The term "processed response" is intended to refer to and include the results produced by screening, sorting, scoring, evaluating, massaging, statistically analyzing, or otherwise machine-processing responses, data and information provided by participants at the receiving stations. The term "hard copy" is intended to refer to and include any kind of permanent record capable of being visually read. The term "simulcast" is intended to refer to the simultaneous, but separate, transmission from different propagating sources of the video and audio portions of a program.

With respect to various embodiments of the invention, the response unit 22 may be configured to provide the foregoing functions of evaluating and scoring, as well as the processed response.

Figure 3:
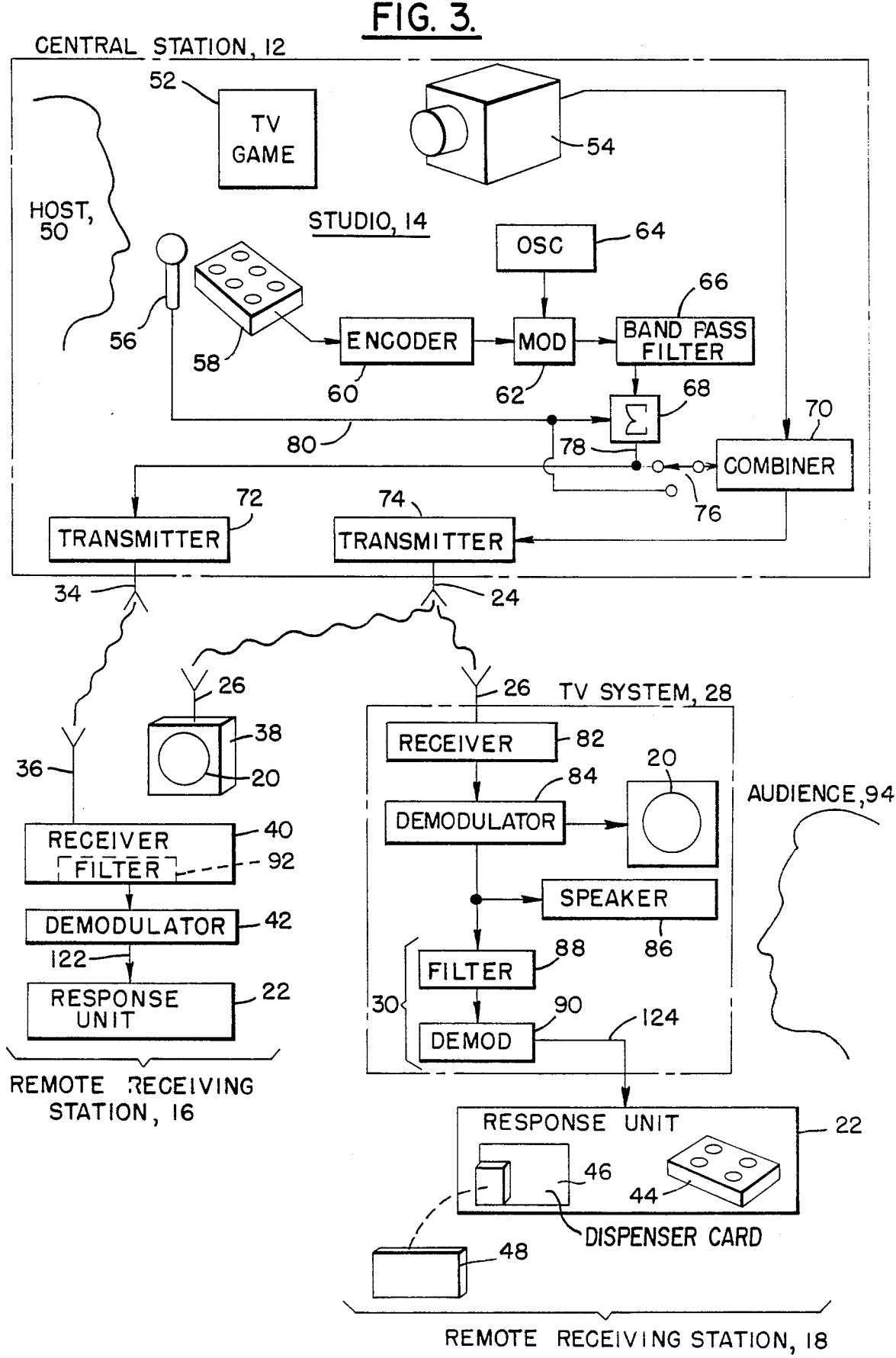
FIG. 3 is a detailed diagram of the system of FIG. 1.

In FIG. 3 the studio 14 is shown, by way of example, to include a television host 50, conducting a game 52 in front of a television camera 54 which views both the game 52 and the host 50, and, when required, display means on stage to provide a televised image thereof. Words spoken by the host 50, as well as other sounds in the studio 14, are converted by a microphone 56 to electric signals. Also included within the studio 14 is a keyboard 58 by which the host 50 or another person, enters commands and instructions to be communicated via the instructional signal. The central station 12 further comprises an encoder 60 a modulator 62, an oscillator 64, a bandpass filter 66, a summer 68, a combiner 70, a radio transmitter 72, a television transmitter 74, and a switch 76. The switch 76 connects an input terminal of the combiner 70 to either an output terminal of the summer 68 on line 78 or an output terminal of the microphone 56 on line 80.

In operation, the pressing of keys on the keyboard 58 activates the encoder 60 to output digital signals representing the keys which have been pressed. The oscillator 64 outputs a carrier signal which is modulated by the modulator 62 with the digital signals outputted by the encoder 60. The modulator 62 applies the modulated carrier signal to the filter 66 which narrows the bandwidth of the modulated signal to equal the instructional bandwidth shown in FIG. 2. The filtered signal is coupled from the filter 66 to one input terminal of the summer 68, a second input terminal of the summer 68 receiving the output electrical signal from the microphone 56 via line 80. An output signal of the camera 54 is connected to one input terminal of the combiner 70, a second input terminal of the combiner 70 being connectable via the switch 76 in line 78 to an output terminal of the summer 68. In the alternative position of the switch 76, the second input terminal of the combiner 70 is connected via line 80 to receive the output electric signal of the microphone 56 rather than the output signal of the summer 68. An output terminal of the combiner 70 is connected to the television transmitter 74. Signals outputted by the summer 68 are connected via line 78 also to the radio transmitter 72.

Figure 2:
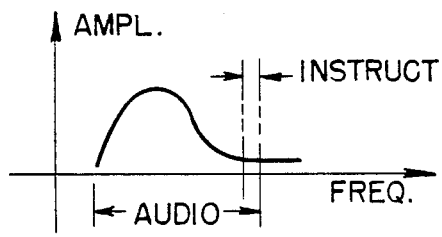
FIG. 2 shows the audio spectrum and a portion thereof designated for an instructional signal.

The signal outputted by the bandpass filter 66 is the instructional signal which is to be transmitted via either the transmitter 72 or 74 to a remote receiving station. The signal outputted by the microphone 56 is the audio signal component of the signals transmitted in the television channel via the transmitter 74, and is also transmitted via the radio transmitter 72 to the remote receiving stations when a radio transmission of the audio portion of the activity in the studio 14 is desired. The summer 68 performs the function of combining the instructional signal with the audio signal whereby the instructional signal shares a small fraction of the audio spectrum as shown in FIG. 2. This is accomplished by adding the output signals of the microphone 56 and the filter 66 to output the sum signal on line 78. The combiner 70 functions, in a well-known fashion, to combine the video portion of the television channel signal from the camera 54 with either the microphone signal on line 80 or the composite signal of the summer 68 depending on the position of the switch 76.

In the event that the simulcast of both the radio and the television transmissions is to be provided by the transmitter 72 and 74, the switch 76 connects the combiner 70 to line 80 in which case the television signal transmitted by the transmitter 74 has the standard format of video and audio portions without the instructional signal, the latter being transmitted via the radio transmitter 72. In the event that the switch 76 is connected to line 78, then the television signal transmitted by the transmitter 74 includes the instructional signal within the audio portion of the television signal.

The circuitry of FIG. 3 demonstrates two possible embodiments of the invention wherein the receiving stations may have either of the two forms shown for the remote receiving stations 16 and 18. If all of the receiving stations have the form of the station 16, then the switch 76 may be placed in the position for connection of the line 80 to the combiner 70, in which case the transmitter 74 transmits a normal television signal while the instructional signal is transmitted by the transmitter 72. In the event that all of the receiving stations are in the form of the station 18 then the switch 76 connects a line 78 to the combiner 70 for providing a modified form of the transmitted television signal wherein the instructional signal is included within the television signal. In such case, the radio transmitter 72 is not used by the invention, but may, nevertheless, transmit a radio program to remote radios which do not form a part of the system of the invention.

The television system 28 comprises a receiver 82, a demodulator 84, and a speaker 86. The separation circuitry 30 comprises a narrow-band filter 88 and a demodulator 90. The passband of the filter 88 is equal to the bandwidth of the instructional signal shown in FIG. 2.

In the operation of the receiving station 16, the receiver 40 functions in the manner of a well-known radio receiver for receiving the radio transmission incident upon the antenna 36. In addition, the receiver 40 includes a narrow-band filter 92 having a passband equal to that of the filter 88. Thereby, the filter 92 extracts from the audio spectrum the portion of the spectrum, shown in FIG. 2 designated for the instructional signal. The signal outputted by the filter 92 is demodulated by the demodulator 42 to recover the digitally formatted signal produced by the encoder 60, which digitally formatted signal is applied to the response unit 22 for providing instruction thereto. The television set 38 in the receiving station 16, as noted hereinabove, functions in accordance with the well-known form of television set outputting both audio and video signals, the latter appearing on the screen 20.

In the operation of the receiving station 18, the receiver 82 includes a well-known television tuner (not shown) and outputs the television signal of the channel to which the receiver 82 is tuned. The television signal outputted by the receiver 82 is demodulated in a well-known fashion by the demodulator 84 to provide a video signal which is presented on the television screen 20, and an audio signal which is presented by the speaker 86.

In accordance with a feature of the invention the demodulator 84 also applies an audio signal to the filter 88 of the separation circuitry 30. The filter 88 extracts the portion of the audio spectrum designated for the instructional signal, as does the filter 92, and outputs the instructional signal to the demodulator 90. The demodulator 90 operates, as does the demodulator 42 to recover the digitally formatted signal produced by the encoder 60, which digitally formatted signal is applied to the response unit 22 to provide instruction thereto. Thereby, the response units 22 of the receiving stations 16 and 18 are able to function concurrently with the presentation of the broadcast television program upon the television screens 20. As indicated in the drawing for the receiving station 18, a member of the normally remote audience 94 operates the keyboard 44 of the response unit 22 while listening to the speaker 86 and watching the television screen 20.

Figure 4:
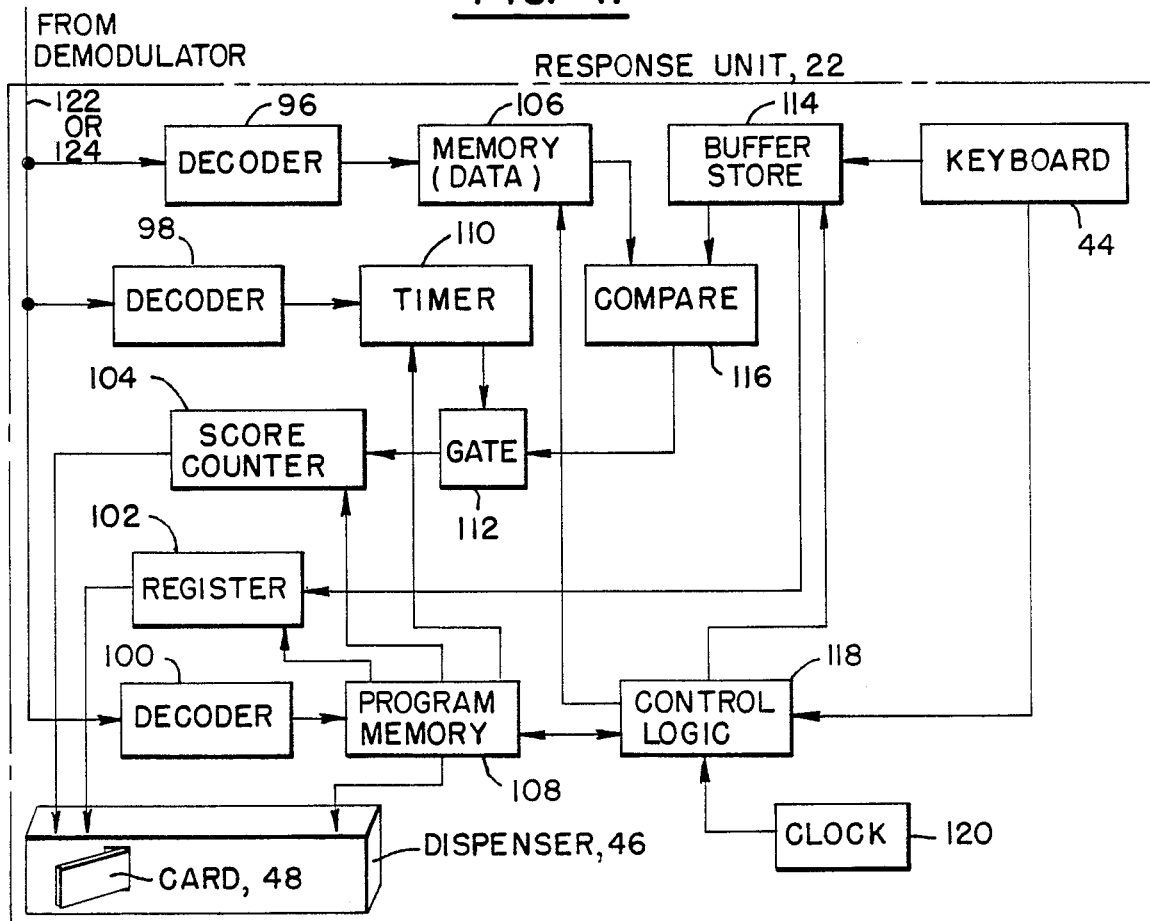
FIG. 4 is a block diagram of an electronic response unit in each remote receiving station of FIGS. 1 and 3.

With reference to FIG. 4, there is shown one embodiment of the response unit 22. The circuitry shown therein accomplishes the major functions of the response unit 22, namely, providing a member of the audience 94 with a means for entering a response to a situation viewed on the television screen 20 and/or heard via the speaker 86, not accepting (rejecting) or accepting, evaluating and scoring such response, recording such response, and outputting a temporary or permanent record of the response. In particular, it can be advantageous if the permanent record is in the form of the card 48, which form is machine readable to facilitate a reading of the score and/or response by either a third party or the host 50. It is to be understood that the circuitry of FIG. 4 constitutes only one possible embodiment of the invention for performing these functions and that other embodiments employing a digital computer suitably programmed (not shown) may also be employed.

The response unit 22 comprises three decoders 96, 98, and 100, a register 102, a score counter 104, a memory 106 for storing data, and a memory 108 for storing an operating program, a timer 110, a gate 112, a buffer store 114, a comparator 116 for comparing output signals of the store 114 with the memory 106, a logic unit 118, and a clock 120, these components being in addition to the keyboard 44 and the dispenser 46 disclosed previously with reference to FIGS. 1 and 3.

In operation, the memory 106 stores data with respect to the answers which are to be provided by the viewing audience. For example, in the event that the viewing audience is composed of children in a children's show wherein children are learning to identify colors, the host may point successively to a red hat, a blue table, and a green car and request to know the colors of the respective objects. In such case, the memory 106 would store the words red, blue, and green in the sequence corresponding to the order in which the objects are to be addressed by the host. The keys on the keyboard 44 may be similarly colored to enable entry of the correct response. Alternatively, for older children, the keyboard may be an alphanumeric keyboard, as is found on a typewriter, in which case the viewing audience is to type the words corresponding to the colors addressed by the host. In this case, the comparator 116 would compare the spelling of the words entered via the keyboard 44 with the spelling of the colors stored in the memory 106. The buffer store 114 stores the responses entered by the keyboard 44 to enable the comparator 116 to compare the response with the data stored in the memory 106.

The counter 104 operates under command from the program memory 108 to score each correct response signal outputted by the comparator 116. When the response entered at the keyboard 44 agrees with the data stored in the memory 106, the comparator 116 outputs a logic-1 signal via gate 112 to the counter 104. The output signal of the comparator 116 serves as an enable signal to initiate a count by the counter 104. The counter increments its count by 1, 2, 3, or other amount depending on the magnitude of the score to be awarded for the correct response. In the event that the response is to be timed in the sense that a limited time is available for the response, then the timer 110 is activated by the program memory 108 to render the gate 112 in a state of conduction to signals of the comparator 116 only during the interval of time when the response is permitted. Both before and after this interval of time, the timer 110 places the gate 112 in a state of nonconduction so that a response entered at the keyboard 44 outside of the desired response interval cannot enable the counter 104 to increment the score.

The output count, score, or evaluation of the counter 104 is applied to the dispenser 46 which includes a recording medium, such as the card 48, for providing a permanent record of the score. The dispenser 46 includes suitable magnetic recording heads (not shown) for recording information on the card 48 in a well-known fashion. In addition, if desired, the dispenser 46 may include well-known encryption circuitry for recording the score on the card 48 in a fashion which cannot be read except by an automatic card reader having circuitry for decrypting the recorded message. The dispenser 46 is activated by the program memory 108 to accomplish the foregoing recording of the score.

The score counter/evaluator 104 can take different forms. While the score counting function is described herein for illustrative purposes, it should be understood that unit 104 may be designed to perform the processing of data entered by respondents on keyboard 44 or other data entering device. Included in such processing are, for instance, the computerized processing of data provided by respondents in accordance with one of several programs stored in memory 108 and brought into play by the instructional or command signals transmitted by transmitters 72 or 74. Questionnaires used in market research may be stored in dispenser 46 or may be placed into it by respondents. Following a set of questions, or upon the completion of the broadcast, processed or unprocessed data are issued by dispenser 46 in the form of hard copy taking the form of one of the embodiments described.

If desired, the actual response typed upon the keyboard 44, such as the words red, blue, and green of the foregoing example, may be recorded by the dispenser 46. For this purpose, the responses are coupled from the buffer store 114 to a register 102 wherein the responses are stored prior to recording at the dispenser 46. After all of the responses have been stored in the register 102, the program memory 108 strobes the register 102 to pass the data of the responses into the dispenser 46 for recordation upon the card 48 or such other form of storage media as may be employed.

The printout mechanism or marking device may take different forms to meet the requirements of the broadcast, whether quiz programs, educational programs, tests or other task setting assignments. These devices may be relatively small, utilizing a tape as the substrate to which the markings are applied, or they may utilize full page printouts. The recording medium may be a special form or blank dispensed individually by the device as a cut section, or may take other, discontinuous shapes.

To prevent tampering, forging and counterfeiting, the recording medium may comprise material, such as paper of special cardboard stock, plastic and the like, or special composition or containing admixtures of identifiable substances facilitating recognition by electronic or other sensing and scanning devices. Verification may also be facilitated by using recording media that are colored, coated, embossed, textured, magnetized or otherwise given recognizable properties.

By replacing the recording media, such as rolls of paper tape, periodically, and by stipulating redemption of the record thus created within a specified time period, the unauthorized reproduction, tampering with and counterfeiting of the marked recording media can, for all practical purposes, be prevented.

The marking may be applied by any known methods, including printing with or without impact, using ink sprays, heat, magnetic pulses, laser beams and other light sources. The markings may also take the form of depressions and embossed configurations legible by appropriate devices.

In addition, to prevent tampering, the recording mechanism, such as a printer, can be provided with means for alternatively and selectively applying one of a plurality of different types of markings. As an example, the color, intensity, width, spacing, positioning, font and resolution of the markings may be built into the recording means and may be controlled by radio or other electronic command signals from a central station.

The shape and configuration of the markings to be utilized at any particular time and subject to change at any time, includes numbers, letters, dots, dashes, regular and irregular shapes, codes, symbols and other configurations, which may be discrete, connected or continuous. The markings may also comprise shapes and configurations having no discernable pattern and readable only by appropriate scanning, reading or decoding means.

The number of combinations and permutations of the above mentioned properties of the recording media and markings is so large as practically to preclude tampering, forging, altering, counterfeiting or reproduction of authentic records; the unauthorized manufacture of special composition paper alone, would be far too costly and particularly time consuming to be practical.

If magnetized cards are used and validated by dispenser, the validation may be erased at the time a card is presented for redemption, so that it may be reused.

It is noted that the data to be stored in the memory 106 is provided by the instruction signal on line 122 or 124 from the demodulators of the receiving stations 16 or 18. The digital format of the instructional signal is decoded by the decoder 96 to extract the portion of the signal relating to the data which is to be stored in memory 106. The decoder 98 decodes that portion of the signal which is to be employed for presetting the timer 110 for the designated interval of response time. The decoder 100 decodes that portion of the instruction signal which presets the memory 108 to any one of a number of previously stored formats for responding to situations presented in the studio 14.

In this regard, it is noted that the form of the instructional signal follows common communication practice wherein the instructional signal is set up as a sequence of digital words or fields which identify respective portions of the message dealing with data, timing interval, and program commands. Thereby, the decoders 96, 98 and 100 are able to recognize the specific parts of the instructional signal and to extract the requisite data and commands.

The control logic 118 operates in response to a succession of clock pulses provided by the clock 120 for outputting control function signals to the memories 106 and 108 and to the buffer store 114. A connection between the keyboard 44 and the logic unit 118 provides for a control function, such as an entry command whereby a person responding directs the store 114 to enter the data inputted by the keyboard 44. The control logic of the unit 118 may also be activated by a command from the program memory 108. Thereby, the response unit 22 is capable of receiving, scoring, and recording a response entered by a member of the audience at a remote receiving station.

The construction of the foregoing system of the invention permits its use in numerous situations wherein members in the external audience are to participate with members of the studio audience in situations requiring participation. An example of the utility of the system may be demonstrated by considering a television game/quiz show involving both people at home as well as in the studio. The invention makes it possible to broadcast quiz show permitting home viewers to become participants and contestants. The invention is applicable to a variety of present and future game shows.

As an illustration, a game show or quiz program may include the task of listing, in reverse chronological order, the names of all teams having won the baseball World Series, or the World Soccer Championship. A time limit is set which makes it impossible for contestants to enter all correct answers; this is common practice in aptitude tests.

There are five contestants on the studio stage. Each studio contestant is equipped with well known means to write, print, type or otherwise enter his or her response on a board, keyboard or other data entering device adapted so that the responses, in the process of being entered, may be projected on a screen or screens visible to the studio audience, but not to the contestants until the predetermined time limit has been reached.

The responses of studio contestants can be displayed to the studio audience and to all home viewers with some delay, thereby preventing any of the home contestants from benefiting from the answers of the stage contestants.

It therefore is an object of the system described to elicit responses from contestants at remote sites and to capture their responses in their data entering devices before the responses given by stage or studio contestants become known to home contestants. This is accomplished by projecting the questions on a screen hidden from studio contestants but in view of the camera 54. Concurrently with, or prior to the projection of the questions, the host 50 employs the keyboard 58 to transmit instructions to the response units 22 of the remote audience. The response entered by participants in the remote audience is timed to conclude before the questions are presented to the studio contestants. Thereby, the responses of the remote audience are not influenced by the responses of the studio contestants.

In a simple version, the system can be employed to attract viewers and listeners not normally disposed to participate in game or quiz shows per se, but willing to answer a few unobtrusive questions, especially if pertaining to a subject of interest to the viewer. The questions to be answered by home viewers and radio listeners can be interspersed in shows other than quiz shows and can be so simple as to require essentially only a confirmation by participants of being tuned in to a particular program.

Thus, for instance, home participants may be asked to identify the soap opera character who earlier appeared in the program. Or home viewers of a sports program may be asked to name a player who just scored. These implementations of the system are intended to increase the television and radio audience. Viewers of a soap opera or persons listening to a radio sports broadcast, constitute a highly targeted audience and as a result of the lower per-household cost, advertisers will be able to award more valuable coupons to successful respondents. Participants who have given an acceptable answer can be rewarded with a coupon of defined value to be applied to the price of a specified product or to the price of any product in a specified retail outlet.

The quantitative results obtained by this method can also be used in the statistical analysis of audiences tuned in to certain programs. In the field of qualitative market analysis and consumer research, the system and methods described can be employed very effectively, substituting home viewers and listeners for the so-called focus groups or other population samples used to determine buyer responses to products and services. The versatility and flexibility of the home keyboard or other data entering device are particularly well suited to the elicitation of unbiased responses to questions or statements by advertising agencies and market analysts. Respondents are rewarded for their cooperation by issuing certificates, coupons and the like to them. The market research made possible by the system and methods described, can be part of a regular quiz show or can can be conducted separately. The permanent records produced by the dispensing means in remote locations can be mailed to the research organization. For this purpose the forms dispensed by the dispensers in participants' homes can take the form of self-addressed return envelopes. Special printed forms may be used in conducting the research into respondents' reactions to tasks or questions.

For the implementation of such game/quiz shows, the following advantages of the invention are noted. The system of the invention does not require any rewiring of a home nor the use of telephone lines, and may be offered to viewers free of charge, and permits home viewers to participate on the spur of the moment without any requirement for special forms or entry blanks. The system can be superposed upon a variety of game and quiz shows to permit viewer participation without interference with existing show formats, and has the advantage of expanding the television audience, thereby attracting sponsors of the shows. The machine readable card 48, or similar coupon which may be outputted by the dispenser 46, may be redeemed for prizes by successful participants at a local store or other business establishment cooperating with the television broadcaster.

The system provides simplicity in the administration of the games by identification of the successful respondents; this is readily accomplished at the dispenser 46 by imprinting each card 48 with the name of the respondent. In particular, if desired, the name of the respondent can be inputted at the keyboard 44 as are other answers to questions. The questions may include multiple-part questions and may require multiple choice answers, if desired. The questions may require simple answers such as yes or no, a single word such as a number or a color, or a plurality of words as in a phase or narrative. Operation of the score counter 104 for various choices of answer permit a scoring of partially correct responses and those meeting a predetermined response criteria.

If, as an example, a respondent must select a number from the numbers 1 through 9, and if the completely accurate answer is 5, the comparator unit may be programmed so as to accept any number between 4 and 6, or 3 and 6, etc.

By way of alternative embodiments to the invention, it is noted that the comparator 116 may output a multiple-bit digital word wherein the additional bits are provided by the memory 106 dependent on the specific answer stored in the memory 106, which answer is compared to the response within the buffer store 144. For example, if two possible responses would be regarded as correct, but one of the two responses is preferred, then the comparator 116 would output an additional bit for the preferred response. The additional bit would be passed by the gate 112 to advance the count of the counter 114, thereby to increase the score by a larger amount when the preferred response is entered at the keyboard 44.

The formatting can provide for various ways of weighting the responses of home contestants, such as straight line additions, geometric and exponential progressions, or computations of scores based on formulas incorporating discrete groups of responses. Thus, score counter 104 may be replaced with a microcomputer (not shown) which is responsive to commands from the memory 108 for combining inputs from keyboard 44, memories 106 and 108, and capable of reflecting the time element, to serve, in effect, as an evaluator of complex answers.

According to the present invention, questions may be transmitted from the central station, to which more than one acceptable answer may be given, the answers varying in the degree of difficulty from respondent's standpoint. As an example, a question may call for naming a minimum of two European cities, the names beginning with the letter M, this being difficulty level 1. Difficulty level 2 might call for four such cities and difficulty level 3 might call for six such cities, all answers to be entered within 30 seconds.

The particular difficulty level may by specified by the person controlling the transmission, or it may be selected by the individual respondent prior to seeing or hearing the question. The degree of difficulty will normally determine the value of the prize, etc. The device evaluating the responses may dispense records, e.g. coupons, certificates and the like of different value or in different demominations. For instance, it may issue a 10 cent coupon at level 1, and 25 cent coupon at level 2, and a 50 cent coupon at level 3. The coupons may be redeemed in retail establishments, similar to those contained in newspapers.

By use of encryption, the card 48 provides an essentially tamper-proof record. The invention is applicable, not only to home viewers but also to viewers in a public establishment such as a restaurant or school wherein people may participate as teams. The questions may be gradated to be suitable for a variety of audiences varying from those having limited formal education to those having special interests. By use of the timer 110, the stuido host can designate the beginning and ends of a response interval, and vary the time limit allowed from question to question. In addition, the invention lends itself to the development of further forms of game and quiz shows.

The foregoing features in the operation of the system of the invention are readily applied to the educational field to encourage both early educational experiences among children as well as for home-study courses for high school and university students. In the educational field, the situation portrayed in the studio and presented on the television screen may be in the nature of a task-setting situation rather than that of a pure question. The appropriate response may contain a number of cross-referenced key words or key phrases. The system of the invention may be implemented also by closed circuit television and cable television as well as for the broadcast situation of FIG. 1. The keyboard 44 at each of the response units 22 may be a standard typewriter keyboard, as noted above, or may include a display of the typed response such as is presently available on some electronic typewriters. Such a display would be useful in the answering of examination questions for home-study programs. It is also noted that the keyboard 44 is representative of a response entry device, and may, if desired, be replaced by other entry devices such as a joystick, switches, or even a device responsive to a spoken voice.

In the practice of the invention, the answers given by studio contestants may, for instance, be displayed to the studio audience and/or broadcast to TV-viewers following a predetermined delay of, say 5–20 seconds. During this 5–20 second period, the data or response entering devices of the stage contestants, or the studio display devices, may be made inoperative, so that no answers may be entered and/or displayed, even if the stage contestants are aware of the questions. Other ways of staggering the "response windows" by 5–20 seconds or more can be devised.

This time lag makes the answers projected on studio screens useless to home contestants from the point of view of elapsed time. By the time the correct answers are televised, all or a critical amount of the allotted time will have elapsed. This forces home contestants to enter their responses before knowing the responses of studio contestants.

To provide attention-attracting action on stage for the studio audience and TV-viewers who are not contestants, the announcer or master of ceremonies can set the stage for the questions, or he can read the questions to the stage contestants and the audience, thereby consuming 5–20 seconds. The questions are displayed on a screen, visible to all TV-viewers, including home contestants. Other ways of giving home contestants a head start of 5–20 seconds, or more, can be devised. In another embodiment, the responses by stage contestants are entered, but not displayed for a predetermined period of time. Home contestants may be allotted more or less time than studio participants. If there is only one participant or contestant on stage, the quiz show still follows the concept outlined.

According to another show format, separate quiz programs for studio contestants and home contestants may be conducted concurrently by the same game show host. He may, for instance, conduct one quiz program for studio contestants in the manner described and while the studio contestants ponder their answers may present supplemental, or a separate set of, questions to home contestants, to which the latter respond in accordance with the method of the present invention.

The examples set forth are simple ones and many different and more complex versions and implementations of the home quiz show are possible and will occur to game show producers.

In some instances, such as in market research, the system described can be employed to identify consumers meeting certain criteria. In that event, the memory and control elements of response unit 22 are programmed in accordance with the requirements of the particular consumer research. Response unit 22 normally is placed in remote locations, which need not be homes and can be other private and public places. In an alternative application of the system, the response unit 22 is equipped with appropriate means capable of limiting the functions of the scoring and evaluation means. For this purpose, controls and switches (not shown) are provided, which cause memories 106 and 108, logic control 118, comparator 116 and gate 112 to selectively perform only those evaluating functions required for the specific application. In such an event, dispenser 46 receives only partially processed data and generates a record of responses entered on keyboard 44 reflecting responses evaluated only to the desired extent and partially resembling the original information entered by respondents.

It is a particular advantage of the present system that the kind of data entering device may vary between different remote locations. Furthermore, the kind of scoring or evaluating device installed at different locations may vary in accordance with the intended use. Thus, for instance, in selected remote locations, electronic devices of known design may be installed, which are capable of subjecting the raw data entered by respondents to computer analysis.

Figure 5:
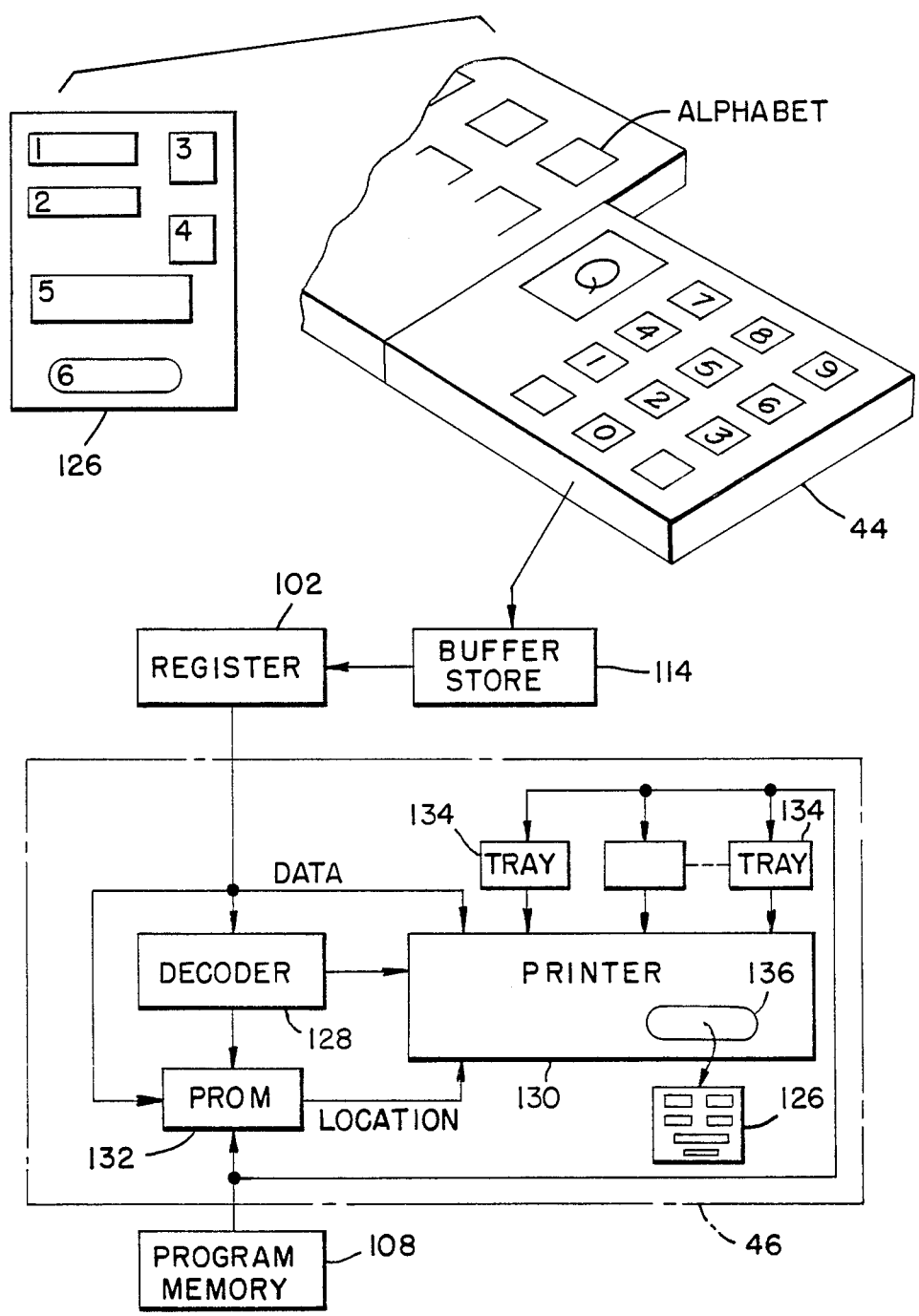
FIG. 5 is a block diagram showing details of a dispenser of FIG. 4.

FIG. 5 shows the buffer store 114, the register 102 and the program memory 108, as well as further details of the dispenser 46 of FIG. 4 to accomplish the imprinting of a response on a recording medium, such as a paper or card, having a prescribed format for the entry of answers. As has been noted hereinabove, such a data entry form or questionnaire, is useful for providing responses by respondents in situations such as contests and other advertising promotional activities. An example of such a questionnaire 126 is shown in FIG. 5. Therein, blocks numbered 1–6 are provided for entry of responses by members of the audience at the remote receiving stations 16 and 18.

Also shown in FIG. 5 is an enlarged fragmentary view of the keyboard 44, the view showing a keypad with keys for the entry of identifying numerals for identifying the blocks of the questionnaire 126 in which the respective answers are to be entered. The respondent identifies a questionnaire block by holding down a control key Q while typing the identifying numeral on the keyboard 44. The response to be entered in that block is then typed by use of the alphabet keys of the keyboard 44.

The dispenser 46 comprises a decoder 128, a printer 130 and a programmable read-only memory (PROM) 132. In operation, the typed answer and the questionnaire block identification is applied by the keyboard 44 and via the store 14 to the register 102. The contents of the register 102, as described hereinabove, are subsequently transferred to the dispenser 46. The decoder 128 detects the presence of a digital word produced by the control key Q, and thereby decodes the incoming digital signals from the register 102 so as to separate the block identification from the response. The decoder 128 activates the printer 130, upon the appearance of the response, to print the response on the questionnaire 126, the latter having been previously placed into the dispenser 46 by the respondent. The decoder also addresses the PROM 132 with the block identification, whereupon the PROM 132 outputs the block location to the printer 130 to direct the printer 130 to print the response at the correct location on the questionnaire 126. Information with respect to the layout of the questionnaire 126 is loaded into the PROM 132 by the program memory 108 as directed by the instructional signal on line 122 or 124 of FIG. 4.

Alternatively, the block location data and the responses may be stored on the card 48 for printing out at another location, such as the facilities of an advertiser or a company providing the promotional activities. The response may include a narrative text, in which case the comparator 116 may be employed to signal the presence of key words in the response, which key words have been previously entered into the data memory 106.

By way of further embodiments of the invention, it is noted that the dispenser 46 may include a group of trays 134 each of which stores a separate set of forms such as the questionnaire 126 upon which a response is to be printed. The trays 134 are activated by a control signal from the program memory 108 to present a blank form to the printer 130 to be imprinted with the response. Information with respect to the desired form to be employed in response to a task-setting situation is loaded into the program memory 108 by the instructional signal on line 122 or 124, whereby the host 50 in the studio 14 designates the requisite form for use in preparing the response. The completed form, or questionnaire 126, exits a slot 136 of the printer 130. The completed questionnaire 126 may be provided on any suitable recording medium which serves as a hard copy such as paper, plastic strip, or plastic card.

As was shown with respect to FIG. 4, the score counter 104 is under control of the program memory 108. This permits the score counter 104 to be activated and deactivated by commands transmitted via the instructional signal. In the outputting of the foregoing questionnaire 126 from the printer 130 with words printed in the appropriate blocks, a score can also be imprinted upon the questionnaire 126 upon activation of the counter 104, which score is omitted upon deactivation of the counter 104.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A system for broadcasting task-setting program signals from a central site to a plurality of receiving stations at remote sites, and for responding to said program signals at said receiving stations, said system comprising:

means at said central site for transmitting a program signal;

means at each of said receiving stations for presenting a program transmitted by said program signal to an audience, said program being a television program;

means at said central site for transmitting an instructional signal incorporating predetermined response criteria;

means at said central site for encoding said instructional signal, said encoding means being suitable for operation by a conductor of said television program, said instructional-signal transmitting means including means for modulating encoded instructional signals upon a voice channel of said television program;

means at each of said receiving stations responsive to said instructional signal for storing said predetermined response criteria;

means at each of said receiving stations for entering a response by members of said audience to a situation presented in said program;

means at each of said receiving stations for comparing said audience response to said predetermined response criteria;

means coupled to said comparing means for scoring said audience response; and demodulation means at said receiving station coupled to said predetermined response criteria storing means for extracting said instructional signal from said voice channel of said transmitted program signal; and wherein said scoring means includes means for timing the response of said audience;

said entering means includes buffer storing means for storing said audience response, said buffer storing means outputting the audience response to said comparison means;

said scoring means includes means for designating a mode of scoring individual ones of said audience responses in response to said instructional signal; and wherein said instructional signal can be generated to activate said designating means of said scoring means independently of a transmission of the program signal.

2. A system according to claim 1, further comprising:

means at said receiving stations responsive to said instructional signal for activating and deactivating said scoring means; and means for outputting a hard copy of said responses, said hard copy including a scoring of said responses upon activation of said scoring means, and excluding a scoring of said responses upon a deactivating of said scoring means.

3. A system for broadcasting task-setting program signals from a central site to a plurality of receiving stations at remote sites, and for responding to said program signals at said receiving stations, said system comprising:

means at said central site for transmitting a program signal;

means at each of said receiving stations for presenting a program transmitted by said program signal to an audience;

means at said central site for transmitting an instructional signal incorporating predetermined response criteria;

means at each of said receiving stations responsive to said instructional signal for storing said predetermined response criteria;

means at each of said receiving stations for entering a response by said audience to a situation presented in said program;

means at each of said receiving stations for comparing said audience response to said predetermined response criteria;

means coupled to said comparing means for scoring said audience response; and recording means coupled to said scoring means for generating a record of scored responses of said audience; and wherein said recording means outputs a recording medium storing response score data for subsequent reading;

said scoring means includes means for timing the response of said audience;

said scoring means includes means for designating a mode of scoring individual ones of said audience responses in response to said instructional signal; and wherein said instructional signal can be generated to activate said designating means of said scoring means independently of a transmission of the program signal.

4. A system for broadcasting task-setting program signals from a central site to a plurality of receiving stations at remote sites, and for responding to said program signals at said receiving stations, said system comprising:

means at said central site for transmitting a program signal;

means at each of said receiving stations for presenting a program transmitted by said program signal to an audience;

means at said central site for transmitting an instructional signal incorporating predetermined response criteria;

means at each of said receiving stations responsive to said instructional signal for storing said predetermined response criteria;

means at each of said receiving stations for entering a response by individual members of said audience to a situation presented in said program;

means at each of said receiving stations for comparing said audience response to said predetermined response criteria;

means coupled to said comparing means for scoring said audience response; and means at said central site for encoding said instructional signal, and wherein said instructional-signal transmitting means includes means for modulating encoded instructional signals upon a voice signal to be transmitted by said instructional signal transmitting means; said system further comprising demodulation means at said receiving station coupled to said response criteria storing means for extracting said instructional signal from said voice signal of said transmitted programs signal; and wherein said entering means includes buffer storing means for storing said audience response, said buffer storing means outputting individual ones of the audience responses to said comparison means;

said scoring means includes means responsive to said instructional signal for timing individual ones or the responses of said audience;

said scoring means includes means for designating a mode of scoring in response to said instructional signal; and wherein said means for transmitting said instructional signal includes means for generating said instructional signal, independently of a transmission of a program signal, to activate said scoring means to set said timing.

5. A system for broadcasting task-setting program signals from a central site to a plurality of receiving stations at remote sites, and for responding to said program signals at said receiving stations, said system comprising:

means at said central site for transmitting a program signal;

means at each of said receiving stations for presenting a program transmitted by said program signal to an audience;

means at said central site for transmitting an instructional signal incorporating predetermined response criteria;

means at each of said receiving stations responsive to said instructional signal for storing said predetermined response criteria;

means at each of said receiving stations for entering a response by said audience to a situation presented in said program;

means at each of said receiving stations for comparing individual ones of said audience responses to said predetermined response criteria;

means coupled to said comparing means for scoring said audience responses; and wherein said scoring means includes means responsive to said instructional signal for timing individual ones of the responses of said audience, said timing means having means for setting a time interval allowed for entering said responses;

said entering means includes buffer storing means for storing said audience response, said buffer storing means outputting the audience response to said comparison means;

said scoring means includes means for designating a mode of scoring in response to said instructional signal; and said system further comprising:

recording means coupled to said scoring means for outputting a record of scored responses of said audience, said record having easily recognizable indicia and being in the form of hard copy;

means at said remote station responsive to said instructional signal for activating and deactivating said scoring means; and said hard copy including the results of a scoring of said responses upon activation of said scoring means, and excluding a scoring of said responses upon a deactivating of said scoring means; and wherein a response produced on said hard copy is in the form of a set of words;

said means for transmitting said instructional signal includes means for generating said instructional signal, independently of a transmission of a program signal, to activate said scoring means to set said timing; and said instructional signal can be generated to activate said designating means of said scoring means independently of a transmission of the program signal.

6. A system according to any of claims 1, 3, 4, or 5 wherein said timing means includes means for setting a time interval allowed for entering said responses.

7. A system according to claim 6 wherein said timing means further includes means for deactivating said scoring means.

8. A system according to one of claims 1, 3, 4, or 5 wherein said timing means further includes means for deactivating said scoring means.

9. A system for broadcasting task-setting program signals from a central site to a plurality of receiving stations at remote sites, and for responding to said program signals at said receiving stations, said system comprising:

means at said central site for transmitting a program signal;

means at each of said receiving stations for presenting a program transmitted by said program signal to an audience;

means at each of said receiving stations for entering a response by said audience to a situation presented in said program;

means at each of said receiving stations coupled to said entering means for generating a hard copy of said response;

means at said central site for transmitting an instructional signal;

means at each of said receiving stations responsive to said instructional signal for storing a desired response to said program signals;

means coupled to said entering means and to said storing means for scoring said response, a score of said scoring means appearing on said hard copy upon activation of said scoring means; and means responsive to said instructional signal for activating said scoring means; and wherein said copy-generating means comprises means for selecting a recording medium to serve as said hard copy, said selecting means being responsive to said instructional signal; and said means for transmitting said instructional signal includes means for generating said instructional signal, independently of a transmission of the program signal, to activate said scoring means to select a mode of scoring by said scoring means.

10. A system for broadcasting task-setting program signals from a central site to a remote audience at a plurality of receiving stations and for responding to said program signals at said receiving stations, said system comprising:

means at said central site for transmitting a program signal;

means at each of said receiving stations for presenting a program transmitted by said program signal to said remote audience;

means at said central site for transmitting an instructional signal incorporating formatted response criteria, said response criteria including a mode of scoring responses and the period of time allowed respondents for entering responses;

formatting means at a central site suitable for operation by a conductor of said broadcast program for formatting said response criteria prior to transmission of said response criteria by said transmitting means, said formatting means being suitable for operation by a conductor of said broadcast program independently of a transmission of the program signal, so as to select the mode of scoring responses and the period of time allowed respondents for entering responses;

means at said central site suitable for operation by a conductor of said broadcast program for encoding said instructional signal;

means included in said instructional signal transmitting means for modulating said encoded instructional signal upon a voice channel of a program broadcast from said central site;

means at each of said receiving stations responsive to said instructional signal for storing formatted response criteria;

means at each of said receiving stations for entering responses by members of said remote audience to a task presented in said program, said entering means including buffer storing means at each remote location for storing said remote audience response;

demodulation means at each of said receiving stations coupled to said response entering means for extracting said instructional signal from said voice channel of said transmitted program signal;

means included in said response entering means for comparing each of said remote audience responses with said formatted response criteria;

means included in said buffer storing means for outputting said remote audience response to said comparing means;

means included in said response entering means and coupled to said comparing means for scoring said remote audience responses, said scoring means including means for limiting the period of time allowed for entering a response by members of said remote audience in accordance with said formatted response criteria and means for timing such response; and means for recording said scored responses.

11. A system according to claim 10 wherein said scoring means provides any one of a set of functions selected from a group of scoring functions consisting of scoring, evaluating, sorting, screening, analyzing, processing, accepting, and rejecting said responses.

12. A system according to claim 10, wherein said scoring means comprises counter means for scoring partially correct answers.

13. A system according to claim 10, wherein said response entering means is provided with control means responsive to said instructional signal and capable of selectively limiting scoring functions of said scoring means so as to perform only desired scoring functions.

14. A system according to claim 10 wherein said response entering means comprises means permitting an individual respondent at a remote location to select a difficulty level of the response criteria applied to a question.

15. A system according to claim 10, wherein said recording means produces a record selected from a hard-copy group consisting of coupons, certificates, tokens, tapes, strips, forms, blanks, and cards.

16. A system according to claim 15, wherein said record form comprises a self-addressed return envelope.

17. A system for educating an audience remote from a central site by interaction with a conductor of a program at a central site, the system employing a broadcasting of task-setting program signals from the central site to a plurality of receiving stations at remote sites, and a responding to said program signals at said receiving stations, said system comprising:

means at said central site for transmitting a program signal;

means at each of said receiving stations for presenting a program transmitted by said program signal to an audience;

means at each of said receiving stations for entering a response by said audience to a situation presented in said program;

means at each of said receiving stations coupled to said entering means for generating a hard copy of said response;

means at said central site for transmitting an instructional signal;

means at each of said receiving stations responsive to said instructional signal for storing a desired response to said program signals;

means coupled to said entering means and to said storing means for storing said response, a score of said scoring means appearing on said hard copy upon activation of said scoring means;

timing means operatively coupled to said scoring means for setting a time interval allowed for entering said response;

means responsive to said instructional signal for activating said scoring means; and wherein said copy-generating means comprises means for selecting a recording medium to serve as said hard copy, said selecting means being responsive to said instructional signal; and said means for transmitting said instructional signal includes means for generating said instructional signal, independently of a transmission of the program signal, to activate said scoring means to select a mode of scoring by said scoring means.

18. A system according to claim 17 wherein said timing means further includes means for deactivating said scoring means upon termination of said time interval.

19. A system for aiding research by an audience remote from a central site by interaction of members of the audience with a conductor of a program at a central site, the system employing a broadcasting of task-setting program signals from the central site to the audience at a plurality of receiving stations and a responding to said program signals at said receiving stations, said system comprising:

means at said central site for transmitting a program signal;

means at each of said receiving stations for presenting a program transmitted by said program signal to said remote audience;

means at said central site for transmitting an instructional signal incorporating formatted response criteria, said response criteria including a mode of scoring responses and the period of time allowed resondents for entering responses;

formatting means at a central site suitable for operation by a conductor of said broadcast program for formatting said response criteria prior to transmission of said response criteria by said transmitting means, said formatting means being suitable for operation by a conductor of said broadcast program independently of a transmission of the program signal, so as to select the mode of scoring responses and the period of time allowed respondents for entering responses;

means at said central site suitable for operation by a conductor of said broadcast program for encoding said instructional signal;

means included in said instructional signal transmitting means for modulating said encoded instructional signal upon a voice channel of a program broadcast from said central site;

means at each of said receiving stations responsive to said instructional signal for storing formatted criteria;

means at each of said receiving stations for entering responses by members of said remote audience to a task presented in said program, said entering means including buffer storing means at each remote location for storing said remote audience response;

demodulation means at each of said receiving stations coupled to said response entering means for extracting said instructional signal from said voice channel of said transmitted program signal;

means included in said response entering means for comparing each of said remote audience responses with said formatted response criteria;

means included in said buffer storing means for outputting said remote audience response to said comparing means;

means included in said response entering means and coupled to said comparing means for scoring said remote audience responses, said scoring means including means for limiting the period of time allowed for entering a response by members of said remote audience in accordance with said formatted response criteria and means for timing such response;

means for recording said scored responses; and wherein said time limiting means sets a time interval allowed for entering said responses.

20. A system according to claim 19 wherein said time limiting means includes means for deactivating said scoring means upon termination of said time interval.

* * * * *

REEXAMINATION CERTIFICATE (1490th)

United States Patent [19]

Von Kohorn

[11] B1 4,745,468

[45] Certificate Issued    Jun. 11, 1991

[54] SYSTEM FOR EVALUATION AND RECORDING OF RESPONSES TO BROADCAST TRANSMISSIONS

[76] Inventor: Henry Von Kohorn, 215 Rocky Rapids Rd., Stamford, Conn. 06903

Reexamination Request:
No. 90/002,058, Jun. 18, 1990

Reexamination Certificate for:
Patent No.: 4,745,468
Issued: May 17, 1988
Appl. No.: 837,827
Filed: Mar. 10, 1986

[51] Int. Cl.$^5$ .............................................. H04H 9/00
[52] U.S. Cl. ........................................ 358/84; 455/2; 434/323; 273/1 E; 273/DIG. 28
[58] Field of Search ........................ 358/84; 379/92, 93, 379/95, 97, 98, 99, 100, 101, 106; 455/2, 5; 434/323, 316, 350, 351, 362; 273/1 E, 138 A, DIG. 28

[56] References Cited

U.S. PATENT DOCUMENTS

| | | | |
|---|---|---|---|
| 3,095,653 | 7/1963 | Corrigan | 35/9 |
| 3,546,791 | 12/1970 | Koos et al. | 35/9 |
| 3,599,221 | 8/1971 | Baer . | |
| 3,606,688 | 9/1971 | Zawels et al. . | |
| 3,671,668 | 6/1972 | Reiffel . | |
| 3,810,627 | 5/1974 | Levy | 273/138 A |
| 3,848,082 | 11/1974 | Summers . | |
| 3,910,322 | 10/1975 | Hardesty, Jr. et al. | 340/172.5 |
| 3,964,179 | 6/1976 | Bennett | 35/31 R |
| 3,993,861 | 11/1976 | Baer . | |
| 3,999,307 | 12/1976 | Tsuda et al. . | |
| 4,044,380 | 8/1977 | Justice et al. . | |
| 4,052,798 | 10/1977 | Tomita et al. | 35/9 A |
| 4,141,548 | 2/1979 | Everton . | |
| 4,264,924 | 4/1981 | Freeman . | |
| 4,268,744 | 5/1981 | McGeary . | |
| 4,271,351 | 6/1981 | Bloodworth . | |
| 4,329,684 | 5/1982 | Monteath et al. . | |
| 4,339,798 | 7/1982 | Hedges et al. . | |
| 4,377,870 | 3/1983 | Anderson et al. . | |
| 4,388,008 | 6/1983 | Greene et al. . | |
| 4,541,806 | 9/1985 | Zimmerman et al. | 434/258 |
| 4,573,072 | 2/1986 | Freeman . | |
| 4,592,546 | 6/1986 | Fascenda et al. . | |
| 4,593,904 | 6/1986 | Graves | 273/1 E |
| 4,608,601 | 8/1986 | Shreck et al. . | |
| 4,611,996 | 9/1986 | Stoner . | |
| 4,630,040 | 12/1986 | Haertling | 340/763 |
| 4,630,108 | 12/1986 | Gomersall . | |
| 4,671,772 | 6/1987 | Slade et al. | 434/219 |
| 4,807,031 | 2/1989 | Broughton et al. | 358/142 |
| 4,833,710 | 5/1989 | Hirashima | 380/20 |
| 4,907,079 | 3/1990 | Turner et al. | 358/84 |

FOREIGN PATENT DOCUMENTS

| | | |
|---|---|---|
| 1172847 | 8/1984 | Canada . |
| 1287304 | 8/1972 | United Kingdom . |
| 2120507 | 11/1983 | United Kingdom . |

OTHER PUBLICATIONS

Sync (catalog), pp. 2 and 3, Advertisement Titled "Now You Can Beat The Contestants on TV's Most Popular Game Show", 1988.

Rand Report No. R-88-MF, Baer, Nov., 1971.

Pilz, Frank; "Techniques of Subtitle Transmission in Television Programmes, e.g. for the Deaf"; World Telecommunication Forum Technical Symposium, Geneva, Switz., Oct. 6–8, 1975 (p. 1 only–3.4.8.1–).

*Primary Examiner*—James L. Dwyer

[57] ABSTRACT

A system for evaluating responses to broadcast programs, such as television programs, includes an instructional signal modulated onto an audio signal transmitted concurrently with the television program. At each of a plurality of remote receiving stations, one or more members of a remote audience has the opportunity to respond to a situation presented in the television program by entering a response on a keyboard. The system includes, at each remote receiving station, a memory responsive to the instructional signal for storing desired responses or response criteria, and a comparison circuit for comparing responses entered at the keyboard with the response criteria stored in the memory. Also provided is electronic circuitry for scoring the responses in accordance with commands from the instructional signal, and a recording device for providing a permanent record of the audience score at each of the remote receiving stations.

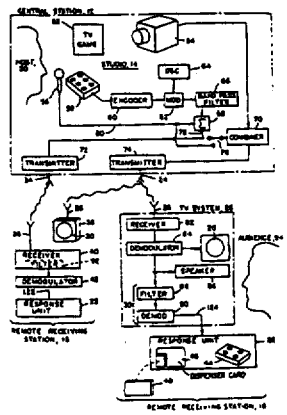

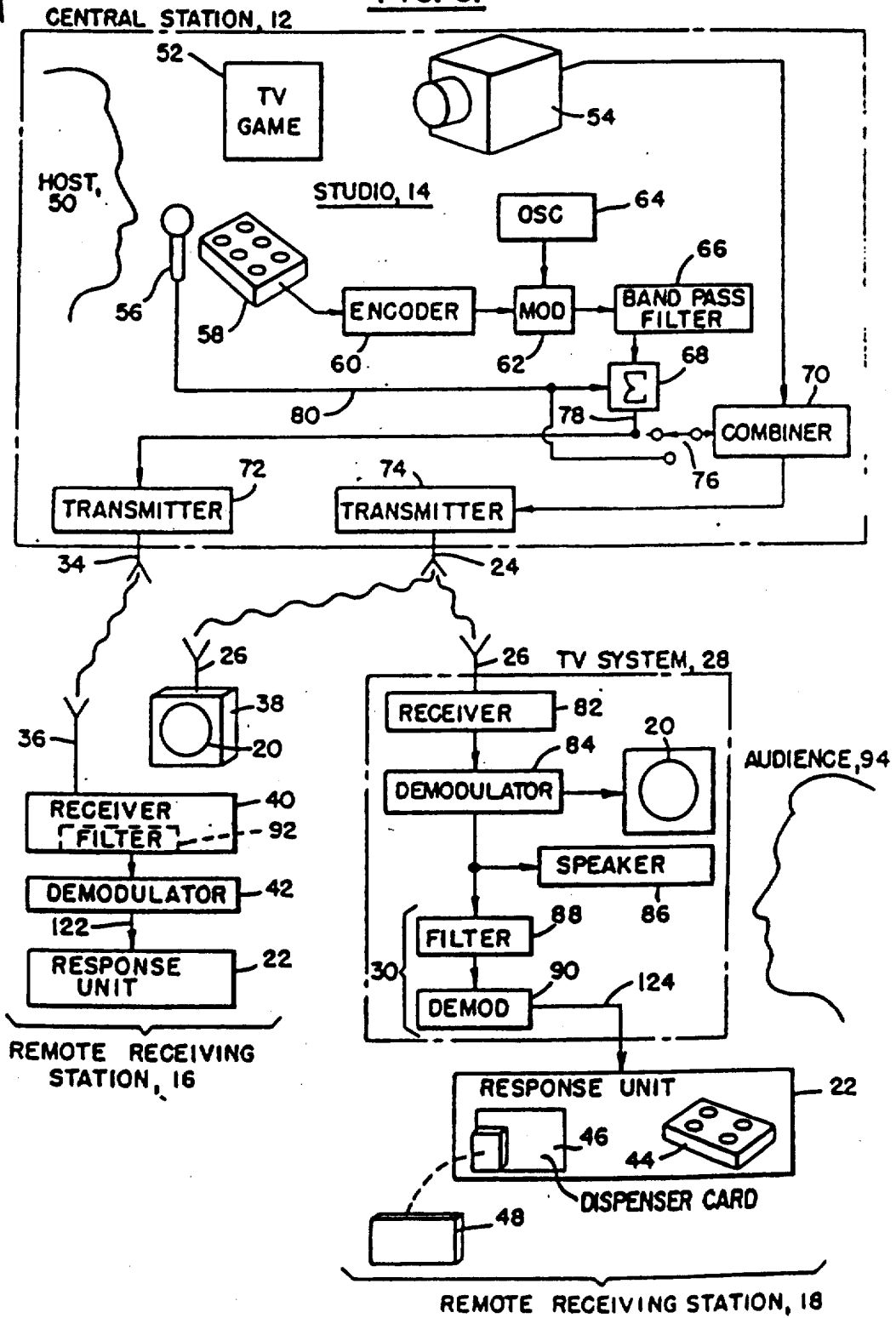

B1 4,745,468

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 4, 5, 9, 10, 17 and 19 are determined to be patentable as amended.

Claims 2, 6, 7, 8, 11, 12, 13, 14, 15, 16, 18 and 20, dependent on an amended claim, are determined to be patentable.

1. A system for broadcasting task-setting program signals from a central site to a plurality of receiving stations at remote sites, and for responding to said program signals at said receiving stations, said system comprising:
   means at said central site for transmitting a program signal;
   means at each of said receiving stations for presenting a program transmitted by said program signal to an audience, said program being a television program;
   means at said central site for transmitting an instructional signal incorporating predetermined response criteria;
   means at said central site for encoding said instructional signal, said encoding means being suitable for operation by a conductor of said television program, said instructional-signal transmitting means including means for modulating encoded instructional signals upon a voice channel of said television program;
   means at each of said receiving stations responsive to said instructional signal for storing said predetermined response criteria;
   means at each of said receiving stations for entering a response by members of said audience to a situation presented in said program;
   means at each of said receiving stations for comparing said audience response to said predetermined response criteria;
   means coupled to said comparing means for scoring said audience response; and
   demodulation means at said receiving station coupled to said predetermined response criteria storing means for extracting said instructional signal from said voice channel of said transmitted program signal; and wherein
   said scoring means includes means for timing the response of said audience;
   said entering means includes buffer storing means for storing said audience response, said buffer storing means outputting the audience response to said comparison means;
   said scoring means includes means for designating a mode of scoring individual ones of said audience responses in response to said instructional signal; and wherein
   said instructional signal can be generated to activate said designating means of said scoring means independently of a transmission of the program signal *wherein said program and said instructional signals provide information of said task-setting program signals, said information comprising at least one question which is either a single-part question or a multiple-part question, said information further comprising scoring criteria; and*
   *said information has been determined prior to operation of said entering means for an entering of a response.*

3. A system for broadcasting task-setting program signals from a central site to a plurality of receiving stations at remote sites, and for responding to said program signals at said receiving stations, said system comprising:
   means at said central site for transmitting a program signal;
   means at each of said receiving stations for presenting a program transmitted by said program signal to an audience;
   means at said central site for transmitting an instructional signal incorporating predetermined response criteria;
   means at each of said receiving stations responsive to said instructional signal for storing said predetermined response criteria;
   means at each of said receiving stations for entering a response by said audience to a situation presented in said program;
   means at each of said receiving stations for comparing said audience response to said predetermined response criteria;
   means coupled to said comparing means for scoring said audience response; and
   recording means coupled to said scoring means for generating a record of scored responses of said audience; and wherein
   said recording means outputs a recording medium storing response score data for subsequent reading;
   said scoring means includes means for timing the response of said audience;
   said scoring means includes means for designating a mode of scoring individual ones of said audience responses in response to said instructional signal; and wherein
   said instructional signal can be generated to activate said designating means of said scoring means independently of a transmission of the program signal *wherein said program and said instructional signals provide information of said task-setting program signals, said information comprising at least one question which is either a single-part question or a multiple-part question, said information further comprising scoring criteria; and*
   *said information has been determined prior to operation of said entering means for an entering of a response.*

4. A system for broadcasting task-setting program signals from a central site to a plurality of receiving stations at remote sites, and for responding to said program signals at said receiving stations, said system comprising:
   means at said central site for transmitting a program signal;

means at each of said receiving stations for presenting a program transmitted by said program signal to an audience;

means at said central site for transmitting an instructional signal incorporating predetermined response criteria;

means at each of said receiving stations responsive to said instructional signal for storing said predetermined response criteria;

means at each of said receiving stations for entering a response by individual members of said audience to a situation presented in said program;

means at each of said receiving stations for comparing said audience response to said predetermined response criteria;

means coupled to said comparing means for scoring said audience response; and means at said central site for encoding said instructional signal, and wherein said instructional-signal transmitting means includes means for modulating encoded instructional signals upon a voice signal to be transmitted by said instructional signal transmitting means; said system further comprising demodulation means at said receiving station coupled to said response criteria storing means for extracting said instructional signal from said voice signal of said transmitted programs signal; and wherein said entering means includes buffer storing means for storing said audience response, said buffer storing means outputting individual ones of the audience responses to said comparison means;

said scoring means includes means responsive to said instructional signal for timing individual ones [or-] *of* the responses of said audience;

said scoring means includes means for designating a mode of scoring in response to said instructional signal; and wherein said means for transmitting said instructional signal includes means for generating said instructional signal, independently of a transmission of a program signal, to activate said scoring means to set said timing *wherein said program and said instructional signals provide information of said task-setting program signals, said information comprising at least one question which is either a single-part question or a multiple-part question, said information further comprising scoring criteria; and*

*said information has been determined prior to operation of said entering means for an entering of a response.*

5. A system for broadcasting task-setting program signals from a central site to a plurality of receiving stations at remote sites, and for responding to said program signals at said receiving stations, said system comprising:

means at said central site for transmitting a program signal;

means at each of said receiving stations for presenting a program transmitted by said program signal to an audience;

means at said central site for transmitting an instructional signal incorporating predetermined response criteria;

means at each of said receiving stations responsive to said instructional signal for storing said predetermined response criteria;

means at each of said receiving stations for entering a response by said audience to a situation presented in said program;

means at each of said receiving stations for comparing individual ones of said audience responses to said predetermined response criteria;

means coupled to said comparing means for scoring said audience responses; and wherein said scoring means includes means responsive to said instructional signal for timing individual ones of the responses of said audience, said timing means having means for setting a time interval allowed for entering said responses;

said entering means includes buffer storing means for storing said audience response, said buffer storing means outputting the audience response to said comparison means;

said scoring means includes means for designating a mode of scoring in response to said instructional signal; and said system further comprising:

recording means coupled to said scoring means for outputting a record of scored responses of said audience, said record having easily recognizable indicia and being in the form of hard copy;

means at said remote station responsive to said instructional signal for activating and deactivating said scoring means; and said hard copy including the results of a scoring of said responses upon activation of said scoring means, and excluding a scoring of said responses upon a deactivating of said scoring means; and wherein a response produced on said hard copy is in the form of a set of words;

said means for transmitting said instructional signal includes means for generating said instructional signal, independently of a transmission of a program signal, to activate said scoring means to set said timing; and said instructional signal can be generated to activate said designating means of said scoring means independently of a transmission of the program signal *wherein said program and said instructional signals provide information of said task-setting program signals, said information comprising at least one question which is either a single-part question or a multiple-part question, said information further comprising scoring criteria; and*

*said information has been determined prior to operation of said entering means for an entering of a response.*

9. A system for broadcasting task-setting program signals from a central site to a plurality of receiving stations at remote sites, and for responding to said program signals at said receiving stations, said system comprising:

means at said central site for transmitting a program signal;

means at each of said receiving stations for presenting a program transmitted by said program signal to an audience;

means at each of said receiving stations for entering a response by said audience to a situation presented in said program;

means at each of said receiving stations coupled to said entering means for generating a hard copy of said response;

means at said central site for transmitting an instructional signal;

means at each of said receiving stations responsive to said instructional signal for storing a desired response to said program signals;

means coupled to said entering means and to said storing means for scoring said response, a score of said scoring means appearing on said hard copy upon activation of said scoring means; and means responsive to said instructional signal for activating said scoring means; and wherein said copy-generating means comprises means for selecting a recording medium to serve as said hard copy, said selecting means being responsive to said instructional signal; and said means for transmitting said instructional signal includes means for generating said instructional signal, independently of a transmission of the program signal, to activate said scoring means to select a mode of scoring by said scoring means *wherein said program and said instructional signals provide information of said task-setting program signals, said information comprising at least one question which is either a single-part question or a multiple-part question, said information further comprising scoring criteria; and*

*said information has been determined prior to operation of said entering means for an entering of a response.*

10. A system for broadcasting task-setting program signals from a central site to a remote audience at a plurality of receiving stations and for responding to said program signals at said receiving stations, said system comprising:

means at said central site for transmitting a program signal;

means at each of said receiving stations for presenting a program transmitted by said program signal to said remote audience;

means at said central site for transmitting an instructional signal incorporating formatted response criteria, said response criteria including a mode of scoring responses and the period of time allowed respondents for entering responses;

formatting means at a central site suitable for operation by a conductor of said broadcast program for formatting said response criteria prior to transmission of said response criteria by said transmitting means, said formatting means being suitable for operation by a conductor of said broadcast program independently of a transmission of the program signal, so as to select the mode of scoring responses and the period of time allowed respondents for entering responses;

means at said central site suitable for operation by a conductor of said broadcast program for encoding said instructional signal;

means included in said instructional signal transmitting means for modulating said encoded instructional signal upon a voice channel of a program broadcast from said central site;

means at each of said receiving stations responsive to said instructional signal for storing formatted response criteria;

means at each of said receiving stations for entering responses by members of said remote audience to a task presented in said program, said entering means including buffer storing means at each remote location for storing said remote audience response;

demodulation means at each of said receiving stations coupled to said response entering means for extracting said instructional signal from said voice channel of said transmitted program signal;

means included in said response entering means for comparing each of said remote audience responses with said formatted response criteria;

means included in said buffer storing means for outputting said remote audience response to said comparing means;

means included in said response entering means and coupled to said comparing means for scoring said remote audience responses, said scoring means including means for limiting the period of time allowed for entering a response by members of said remote audience in accordance with said formatted response criteria and means for timing such response; and means for recording said scored responses *wherein said program and said instructional signals provide information of said task-setting program signals, said information comprising at least one question which is either a single-part question or a multiple-part question, said information further comprising scoring criteria; and*

*said information has been determined prior to operation of said entering means for an entering of a response.*

17. A system for educating an audience remote from a central site by interaction with a conductor of a program at a central site, the system employing a broadcasting of task-setting program signals from the central site to a plurality of receiving stations at remote sites, and a responding to said program signals at said receiving stations, said system comprising:

means at said central site for transmitting a program signal;

means at each of said receiving stations for presenting a program transmitted by said program [signal] *signals* to an audience;

means at each of said receiving stations for entering a response by said audience to a situation presented in said program;

[means at each of said receiving stations coupled to said entering means for generating a hard copy of said response;]

means at said central site for transmitting an [instructional] *instruction* signal;

means at each of said receiving stations responsive to said instructional signal for storing a desired response to said program signals;

means coupled to said entering means and to said storing means for [storing] *scoring* said response, a score of said scoring means appearing on said hard copy upon activation of said scoring means;

timing means operatively coupled to said scoring means for setting a time interval allowed for entering said response;

means responsive to said instructional signal for activating said scoring means; and wherein said copy-generating means comprises means for selecting a recording medium to serve as said hard copy, said selecting means being responsive to said instructional signal; and said means for transmitting said instructional signal includes means for generating said instructional signal, independently of a transmission of the program signal, to activate said scoring means to select a mode of scoring by said scoring means *wherein said program and said instructional signals provide information of said task-setting program signals, said*

*information comprising at least one question which is either a single-part question or a multiple-part question, said information further comprising scoring criteria; and*

*said information has been determined prior to operation of said entering means for an entering of a response.*

19. A system for aiding research by an audience remote from a central site by interaction of members of the audience with a conductor of a program at a central site, the system employing a broadcasting of task-setting program signals from the central site to the audience at a plurality of receiving stations and a responding to said program signals at said receiving stations, said system comprising:

means at said central site for transmitting a program signal;

means at each of said receiving stations for presenting a program transmitted by said program signal to said remote audience;

means at said central site for transmitting an instructional signal incorporating formatted response criteria, said response criteria including a mode of scoring responses and the period of time allowed [repondents] *respondents* for entering responses;

formatting means at a central site suitable for operation by a conductor of said broadcast program for formatting said response criteria prior to transmission of said response criteria by said transmitting means, said formatting means being suitable for operation by a conductor of said broadcast program independently of a transmission of the program signal, so as to select the mode of scoring responses and the period of time allowed respondents for entering responses;

means at said central site suitable for operation by a conductor of said broadcast program for encoding said instructional signal;

means included in said instructional signal transmitting means for modulating said encoded instructional signal upon a voice channel of a program broadcast from said central site;

means at each of said receiving stations responsive to said instructional signal for storing formatted criteria;

means at each of said receiving stations for entering responses by members of said remote audience to a task presented in said program, said entering means including buffer storing means at each remote location for storing said remote audience response;

demodulation means at each of said receiving stations coupled to said response entering means for extracting said instructional signal from said voice channel of said transmitted program signal;

means included in said response entering means for comparing each of said remote audience responses with said formatted response criteria;

means included in said buffer storing means for outputting said remote audience response to said comparing means;

means included in said response entering means and coupled to said comparing means for scoring said remote audience responses, said scoring means including means for limiting the period of time allowed for entering a response by members of said remote audience in accordance with said formatted response criteria and means for timing such response;

means for recording said scored responses; and wherein said time limiting means sets a time interval allowed for entering said responses *wherein said program and said instructional signals provide information of said task-setting program signals, said information comprising at least one question which is either a single-part question or a multiple-part question, said information further comprising scoring criteria; and*

*said information has been determined prior to operation of said entering means an for entering of a response.*

* * * * *